US012680616B2

(12) United States Patent    (10) Patent No.:   US 12,680,616 B2

Hay et al.    (45) Date of Patent:    Jul. 14, 2026

(54) FLUID MIXING ASSEMBLY HAVING A MIXING DEVICE

(71) Applicant: Reliance Worldwide Corporation (Aust.) Pty. Ltd., Queensland (AU)

(72) Inventors: Gary Hay, Queensland (AU); Austin Carter, Queensland (AU)

(73) Assignee: Reliance Worldwide Corporation (Aust.) Pty. Ltd., Queensland (AU)

( * ) Notice: Subject to any disclaimer, the term of this patent is extended or adjusted under 35 U.S.C. 154(b) by 1064 days.

(21) Appl. No.: 17/761,317

(22) PCT Filed: Sep. 25, 2020

(86) PCT No.: PCT/AU2020/051027

§ 371 (c)(1),
(2) Date: Mar. 17, 2022

(87) PCT Pub. No.: WO2021/056076

PCT Pub. Date: Apr. 2, 2021

(65) Prior Publication Data

US 2022/0341499 A1    Oct. 27, 2022

(30) Foreign Application Priority Data

Sep. 26, 2019   (AU) ................................. 2019903626

(51) Int. Cl.
*F16K 11/16*     (2006.01)
*B01F 23/45*     (2022.01)
(Continued)

(52) U.S. Cl.
CPC ............ *F16K 11/163* (2013.01); *B01F 23/45* (2022.01); *B01F 25/1051* (2022.01); (Continued)

(58) Field of Classification Search
CPC ...... B01F 15/026; B01F 5/0077; B01F 5/008; B01F 23/45; B01F 25/1051; B01F 35/187; (Continued)

(56) References Cited

U.S. PATENT DOCUMENTS 2,332,995 A * 10/1943 Eaton ................. G05D 23/1346
                                            137/896
5,161,737 A * 11/1992 Olmsted .............. G05D 23/136
                                         236/12.21
(Continued)

FOREIGN PATENT DOCUMENTS

GB        792455     3/1958
WO   WO-2021056076 A1 * 4/2021 .......... B01F 25/1051

OTHER PUBLICATIONS

PCT International Search Report for PCT Application No. PCT/AU2020/051027 mailed Dec. 9, 2020 (6 pages).
(Continued)

*Primary Examiner* — Charles Cooley
(74) *Attorney, Agent, or Firm* — Barnes & Thornburg LLP

(57) ABSTRACT

A fluid mixing assembly (100) comprising a body (102) having a discharge outlet (114) for discharging fluid; a fluid mixing device (104) disposed in the body (102) and in fluid communication with the discharge outlet (114), the fluid mixing device (104) having an adjusting member (122) adjustable about a mixing adjusting axis (124) and configured to assist in controlling mixing of fluids in the fluid mixing device (104); a first isolator (132) in fluid communication with the fluid mixing device (104) and configured to be coupled in fluid communication to a first source of fluid, the first isolator (132) having an adjusting member (140) adjustable about a first isolator adjusting axis (138) and configured to control a flow of fluid through the first (Continued)

isolator (132); and a second isolator (144) in fluid communication with the fluid mixing device (104) and configured to be coupled in fluid communication to a second source of fluid, the second isolator (144) having an adjusting member (152) adjustable about a second isolator adjusting axis (150) and configured to control a flow of fluid through the second isolator (152). The first isolator (132) and the second isolator (144) are disposed relative to the fluid mixing device (104) such that the mixing adjusting axis (124), the first isolator adjusting axis (138), and the second isolator adjusting axis (150) extend substantially in a common direction.

19 Claims, 6 Drawing Sheets

(51) Int. Cl.
| | |
|---|---|
| *B01F 25/00* | (2022.01) |
| *B01F 35/00* | (2022.01) |
| *F16K 27/02* | (2006.01) |
| *F16K 27/06* | (2006.01) |
| *F16K 31/00* | (2006.01) |

(52) U.S. Cl.
CPC ........ *B01F 35/187* (2022.01); *F16K 27/0263* (2013.01); *F16K 27/067* (2013.01); *F16K 31/002* (2013.01)

(58) Field of Classification Search
CPC ....... B29B 7/7457; B29B 7/802; B29B 7/801; F16K 11/163; F16K 27/0263; F16K 27/067; F16K 31/002; F16K 19/006; F16K 11/04; F16K 31/60; F16K 11/207; F16K 19/00; G05D 7/0126; G05D 7/016; G05D 7/0173; G05D 23/1353
USPC ........................ 366/162.4–162.5, 189, 182.4
See application file for complete search history.

(56) References Cited

U.S. PATENT DOCUMENTS

| | | | |
|---|---|---|---|
| 2003/0031087 A1* | 2/2003 | Fukano ................. | B01F 25/105 |
| | | | 366/175.2 |
| 2003/0218074 A1 | 11/2003 | Beck et al. | |
| 2007/0000547 A1 | 1/2007 | Cochart et al. | |
| 2011/0126919 A1 | 6/2011 | Izzy et al. | |
| 2011/0203689 A1 | 8/2011 | Chang | |
| 2018/0321697 A1* | 11/2018 | Forrestal ................ | G05D 23/13 |
| 2020/0218295 A1* | 7/2020 | Hay ................... | G05D 23/1346 |
| 2021/0055749 A1* | 2/2021 | Hay ................... | G05D 23/1346 |
| 2022/0325814 A1* | 10/2022 | Hay ..................... | F24H 9/2007 |
| 2022/0341499 A1* | 10/2022 | Hay ..................... | F16K 11/163 |
| 2025/0021116 A1* | 1/2025 | Hay ................... | G05D 23/1346 |
| 2026/0079509 A1* | 3/2026 | Li ..................... | G05D 23/1353 |

OTHER PUBLICATIONS

PCT Written Opinion for PCT Application No. PCT/AU2020/051027 mailed Dec. 9, 2020 (8 pages).
Search Report; Australian Patent Application No. 2019903626; Dec. 3, 2019.
International Preliminary Report on Patentability; International Patent Application No. PCT/AU2020/051027; Mar. 15, 2022.

* cited by examiner

FLUID MIXING ASSEMBLY HAVING A MIXING DEVICE

RELATED APPLICATION

This application is a National Stage Application of PCT/AU2020/051027, filed 25 Sep. 2020, which claims priority to Australian provisional patent application no. 2019903626 filed on 26 Sep. 2019, the contents of which are incorporated herein in their entireties by reference.

FIELD OF THE INVENTION

The invention relates to a fluid mixing assembly. In particular, the invention relates, but is not limited, to a fluid mixing assembly including a thermostatic mixing valve (TMV).

BACKGROUND TO THE INVENTION

A TMV is a valve associated with blending hot water with cold water to achieve a substantially constant temperature in the discharged water. TMVs have an adjusting member for setting the temperature of mixed water discharged from the TMV. Other control valves are typically coupled in fluid communication to the TMV to control/regulate the flow of hot water and cold water into the TMV. TMVs are typically installed in confined cabinets or spaces, making it difficult and cumbersome to access and adjust the adjusting member of the TMV and control valves coupled to the TMV.

The present inventors have developed a fluid mixing assembly that may allow for easier access to, and adjustment of, the adjusting member of a TMV and control valves coupled to the TMV.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this specification.

SUMMARY OF INVENTION

In a first aspect, the present invention provides a fluid mixing assembly comprising:

a body having a discharge outlet for discharging fluid;

a fluid mixing device disposed in the body and in fluid communication with the discharge outlet, the fluid mixing device having an adjusting member adjustable about a mixing adjusting axis and configured to assist in controlling mixing of fluids in the fluid mixing device;

a first isolator in fluid communication with the fluid mixing device and configured to be coupled in fluid communication to a first source of fluid, the first isolator having an adjusting member adjustable about a first isolator adjusting axis and configured to control a flow of fluid through the first isolator; and a second isolator in fluid communication with the fluid mixing device and configured to be coupled in fluid communication to a second source of fluid, the second isolator having an adjusting member adjustable about a second isolator adjusting axis and configured to control a flow of fluid through the second isolator, wherein the first isolator and the second isolator are disposed relative to the fluid mixing device such that the mixing adjusting axis, the first isolator adjusting axis, and the second isolator adjusting axis extend substantially in a common direction.

According to embodiments, the adjusting member is coupled to a piston movable in the common direction within the fluid mixing device.

According to embodiments, the discharge outlet is configured to discharge fluid in a discharge direction substantially perpendicular to the common direction.

In an embodiment, the adjusting member of the fluid mixing device, first isolator and/or second isolator are accessible with a tool, substantially in the common direction, to provide adjustment thereof.

In an embodiment, the first isolator and the second isolator are disposed at an angle relative to the fluid mixing device.

In an embodiment, the first isolator and the second isolator are disposed at a transverse angle relative to the fluid mixing device.

In an embodiment, the mixing adjusting axis, the first isolator adjusting axis and/or the second isolator adjusting axis extend transversely to the discharge outlet.

In an embodiment, a first feed valve and a second feed valve are disposed at an angle relative to a discharge axis of the discharge outlet such that the first feed valve axis and the second feed valve axis extend substantially in the common direction. Preferably, the discharge axis is the discharge direction.

In an embodiment, the fluid mixing assembly further comprises an intermediate feed flow path in fluid communication with the first feed valve and the fluid mixing device, wherein the first isolator is in fluid communication with the fluid mixing device via the first feed valve and the intermediate feed flow path.

In an embodiment, the fluid mixing assembly further comprises an intermediate outlet flow path in fluid communication with the fluid mixing device and the discharge outlet, wherein the fluid mixing device is in fluid communication with the discharge outlet via the intermediate outlet flow path.

In an embodiment, the fluid mixing assembly further comprises an intermediate feed chamber in fluid communication with the first feed valve and the fluid mixing device, wherein the first isolator is in fluid communication with the fluid mixing device via the first feed valve and the intermediate feed chamber.

In an embodiment, the fluid mixing assembly further comprises an intermediate outlet chamber in fluid communication with the fluid mixing device and the discharge outlet, wherein the fluid mixing device is in fluid communication with the discharge outlet via the intermediate outlet chamber.

According to embodiments, the first isolator adjusting axis, the second isolator adjusting axis, the first feed valve axis, and the second feed valve axis are substantially parallel. In this manner, the first isolator, the second isolator, the first feed valve and the second feed valve each face in the same direction. The fluid mixing device preferably facing in said same direction.

In an embodiment, the fluid mixing device has a thermal flush override feature. The thermal flush override feature is preferably configured to override the adjusting member of the fluid mixing device.

In an embodiment, the thermal flush override feature overrides the adjusting member by allowing a temperature set by the adjusting member to be (temporarily) adjusted.

In an embodiment, the thermal flush override feature is rotatable about the mixing adjusting axis.

In an embodiment, the thermal flush override feature includes a first component that is able to rotated relative to a second component in order to avoid a part of a thermostatic element.

In an embodiment, the first component provides a stop for engagement with the part of the thermostatic element.

In a second aspect, the present invention provides a fluid mixing assembly comprising:

a body having a discharge outlet for discharging fluid;

an intermediate outlet chamber and in fluid communication with the discharge outlet; and a fluid mixing device disposed in the body and in fluid communication with the discharge outlet via the intermediate outlet chamber, the fluid mixing device having a piston movable in a first direction, wherein the discharge outlet is configured to discharge fluid in a direction transverse to the first direction.

In an embodiment, the fluid mixing device has an adjusting member adjustable about a mixing adjusting axis and configured to assist in controlling mixing of fluids in the fluid mixing device, the fluid mixing assembly further comprising:

a first isolator in fluid communication with the fluid mixing device and configured to be coupled in fluid communication to a first source of fluid, the first isolator having an adjusting member adjustable about a first isolator adjusting axis and configured to control a flow of fluid through the first isolator; and a second isolator in fluid communication with the fluid mixing device and configured to be coupled in fluid communication to a second source of fluid, the second isolator having an adjusting member adjustable about a second isolator adjusting axis and configured to control a flow of fluid through the second isolator, wherein the first isolator and the second isolator are disposed relative to the fluid mixing device such that the mixing adjusting axis, the first isolator adjusting axis, and the second isolator adjusting axis extend substantially in the first/common direction.

In an embodiment, the mixing adjusting axis, the first isolator adjusting axis, and the second isolator adjusting axis are substantially parallel.

In an embodiment, the first isolator and the second isolator are coupled to the body.

In an embodiment, the first isolator and the second isolator are substantially perpendicular to the fluid mixing device.

In an embodiment, the fluid mixing assembly further comprises:

a first feed valve in fluid communication with the fluid mixing device and the first isolator, the first isolator being in fluid communication with the fluid mixing device via the first feed valve; and a second feed valve in fluid communication with the fluid mixing device and the second isolator, the second isolator being in fluid communication with the fluid mixing device via the second feed valve.

In an embodiment, the fluid mixing assembly further comprises an intermediate feed flow path disposed in the body and in fluid communication with the fluid mixing device, wherein the first isolator being in fluid communication with the fluid mixing device via the first feed valve and the intermediate feed flow path.

In an embodiment, the fluid mixing assembly further comprises an intermediate feed chamber disposed in the body and in fluid communication with the fluid mixing device, wherein the first isolator being in fluid communication with the fluid mixing device via the first feed valve and the intermediate feed chamber.

In an embodiment:

the first feed valve has first feed valve axis and a filter associated therewith; and the second feed valve has a second feed valve axis and a filter associated therewith.

In an embodiment:

the first feed valve has a removable cap associated therewith that is configured to be coupled to and decoupled from the body by rotation about the first feed valve axis, and decoupling the removable cap associated with the first feed valve from the body permits access to the filter associated with the first feed valve;

the second feed valve has a removable cap associated therewith that is configured to be coupled to and decoupled from the body by rotation about the second feed valve axis, and decoupling the removable cap associated with the second feed valve from the body permits access to the filter associated with the second feed valve.

In an embodiment, the mixing adjusting axis, the first isolator adjusting axis, the second isolator adjusting axis, the first feed valve axis, and the second feed valve axis are substantially parallel.

In an embodiment, the first feed valve and the second feed valve are disposed in the body.

In an embodiment:

the adjusting member of the fluid mixing device is rotatable about the mixing adjusting axis;

the adjusting member of the first isolator is rotatable about the first isolator adjusting axis; and/or the adjusting member of the second isolator is rotatable about the second isolator adjusting axis.

In an embodiment, the adjusting member of the first isolator adjusts a ball valve of the first isolator, and the adjusting member of the second isolator adjusts a ball valve of the second isolator.

In an embodiment, the intermediate feed flow path and/or the intermediate outlet flow path are disposed in the body.

In an embodiment, the intermediate feed chamber and/or the intermediate outlet chamber are disposed in the body.

In an embodiment, the fluid mixing device has a thermal flush override feature configured to override the adjusting member.

In an embodiment, the thermal flush override feature overrides the adjusting member by allowing a temperature set by the adjusting member to be (temporarily) adjusted.

In an embodiment, the thermal flush override feature is rotatable about the mixing adjusting axis.

In an embodiment, the thermal flush override feature includes a first component that is able to rotated relative to a second component in order to avoid a part of a thermostatic element.

In an embodiment, the first component provides a stop for engagement with the part of the thermostatic element.

In an embodiment, the first feed valve and the second feed valve are check valves.

In an embodiment, the fluid mixing device is a thermostatic mixing valve.

According to embodiments, the first isolator and the second isolator are substantially parallel to a fluid discharge direction of the discharge outlet.

There is further provided herein a kit comprising features of the fluid mixing assembly according to any one or more of the above aspects or embodiments.

According to an aspect, there is provided a kit comprising: a body having: a discharge outlet for discharging a mixed fluid; and a fluid mixing device disposed in fluid communication with the discharge outlet, the fluid mixing device having an adjusting member adjustable about a mixing adjusting axis and configured to assist in controlling mixing of fluids in the fluid mixing device; and at least one of the following:

a first isolator in fluid communication with the fluid mixing device and configured to be coupled in fluid communication to a first source of fluid, the first isolator having an adjusting member adjustable about a first isolator adjusting axis and configured to control a flow of fluid through the first isolator;

a second isolator in fluid communication with the fluid mixing device and configured to be coupled in fluid communication to a second source of fluid, the second isolator having an adjusting member adjustable about a second isolator adjusting axis and configured to control a flow of fluid through the second isolator;

a first feed valve in fluid communication with the fluid mixing device, the first feed valve having a first feed valve axis and a filter associated therewith, the first feed valve having a removable cap associated therewith that is configured to be coupled to and decoupled from the body by rotation about a first feed valve axis, and decoupling the removable cap associated with the first feed valve from the body permits access to the filter associated with the first feed valve; and a second feed valve in fluid communication with the fluid mixing device, the second feed valve has a second feed valve axis and a filter associated therewith, the second feed valve having a removable cap associated therewith that is configured to be coupled to and decoupled from the body by rotation about the second feed valve axis, and decoupling the removable cap associated with the second feed valve from the body permits access to the filter associated with the second feed valve, wherein the mixing adjusting axis and the at least one of the first isolator adjusting axis, the second isolator adjusting axis, the first feed valve axis, and the second feed valve axis each extend in a common direction.

According to a further aspect, there is provided a kit comprising: a body having a discharge outlet for discharging a mixed fluid, the discharge outlet being configured to discharge the mixed fluid in a fluid discharge direction; a fluid mixing device disposed in fluid communication with the discharge outlet; a piston that is configured to move in a first direction within the fluid mixing device to regulate a temperature of a mixture of two input fluids, wherein the first direction is substantially perpendicular to the fluid discharge direction; and at least one of the following:

a thermostatic element configured to move the piston, preferably a spring is configured to bias the thermostatic element;

a first isolator in fluid communication with the fluid mixing device and configured to be coupled in fluid communication to a first source of fluid, the first isolator having an adjusting member adjustable about a first isolator adjusting axis and configured to control a flow of fluid through the first isolator;

a second isolator in fluid communication with the fluid mixing device and configured to be coupled in fluid communication to a second source of fluid, the second isolator having an adjusting member adjustable about a second isolator adjusting axis and configured to control a flow of fluid through the second isolator;

a first feed valve in fluid communication with the fluid mixing device, the first feed valve having a first feed valve axis and a filter associated therewith, the first feed valve having a removable cap associated therewith that is configured to be coupled to and decoupled from the body by rotation about a first feed valve axis, and decoupling the removable cap associated with the first feed valve from the body permits access to the filter associated with the first feed valve; and a second feed valve in fluid communication with the fluid mixing device, the second feed valve has a second feed valve axis and a filter associated therewith, the second feed valve having a removable cap associated therewith that is configured to be coupled to and decoupled from the body by rotation about the second feed valve axis, and decoupling the removable cap associated with the second feed valve from the body permits access to the filter associated with the second feed valve.

Further features and advantages of the present invention will become apparent from the following detailed description.

BRIEF DESCRIPTION OF THE DRAWINGS

Preferred embodiments of the present invention will now be described, by way of examples only, with reference to the accompanying figures, in which.

DETAILED DESCRIPTION OF THE DRAWINGS

Figure 1:
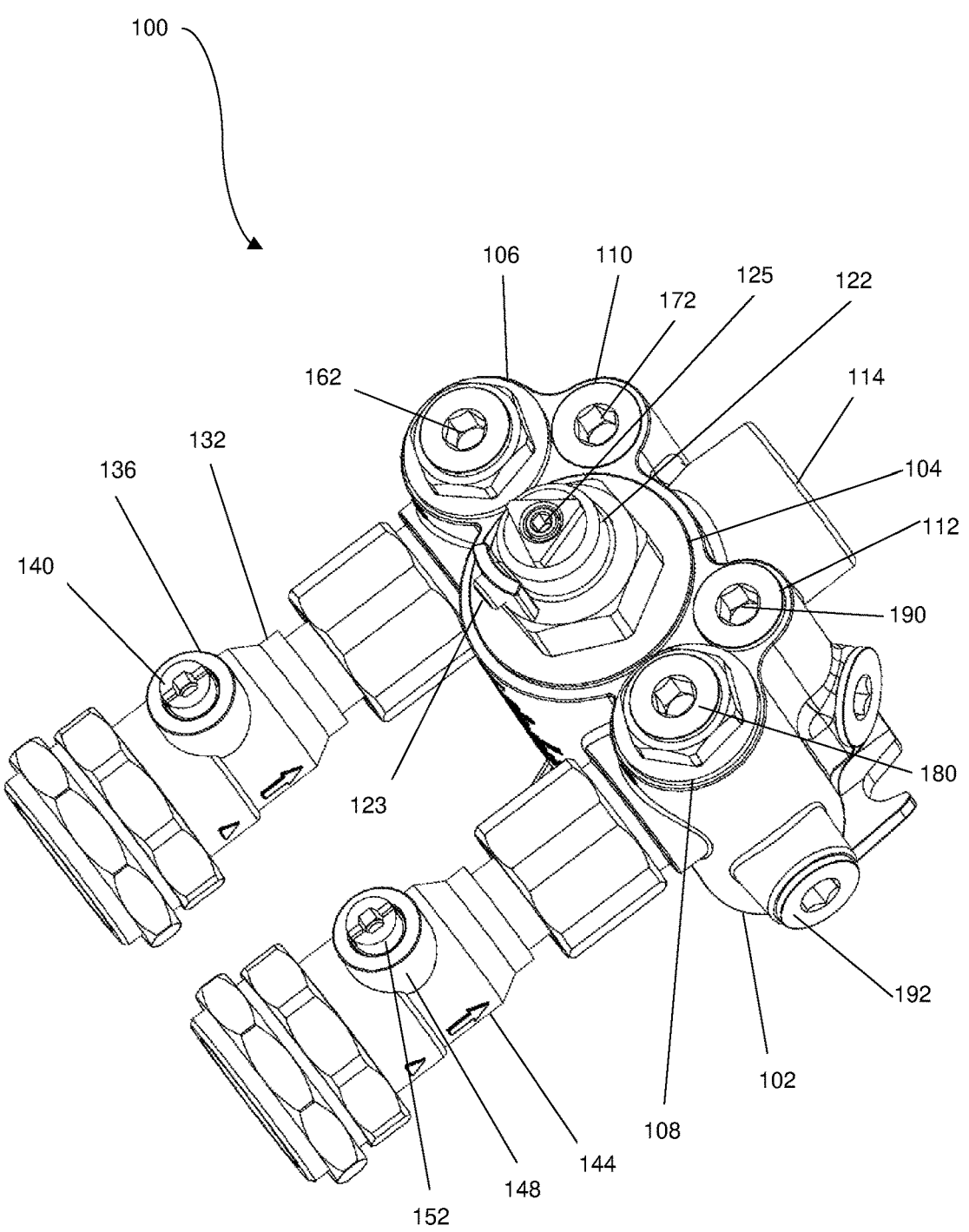
FIG. 1 is an isometric view of a fluid mixing assembly according to an embodiment of the present invention.

FIG. 1 shows a fluid mixing assembly 100 according to an embodiment of the present invention. The fluid mixing assembly 100 has a body 102 that houses a fluid mixing device in the form of a thermostatic mixing valve 104, a first feed valve in the form of a cold-water check valve 106 (e.g., a first check valve), a second feed valve in the form of a hot-water check valve 108 (e.g., a second check valve), an intermediate feed flow path 110, and an intermediate outlet flow path 112. As shown in the accompanying figures, the intermediate outlet feed path 110 is in the form of an intermediate feed chamber. As also shown in the accompanying figures, the intermediate outlet flow path 112 is in the form of an intermediate outlet chamber. The body 102 also has a discharge outlet 114 for discharging mixed water flowing out of the thermostatic mixing valve 104.

Figure 2:
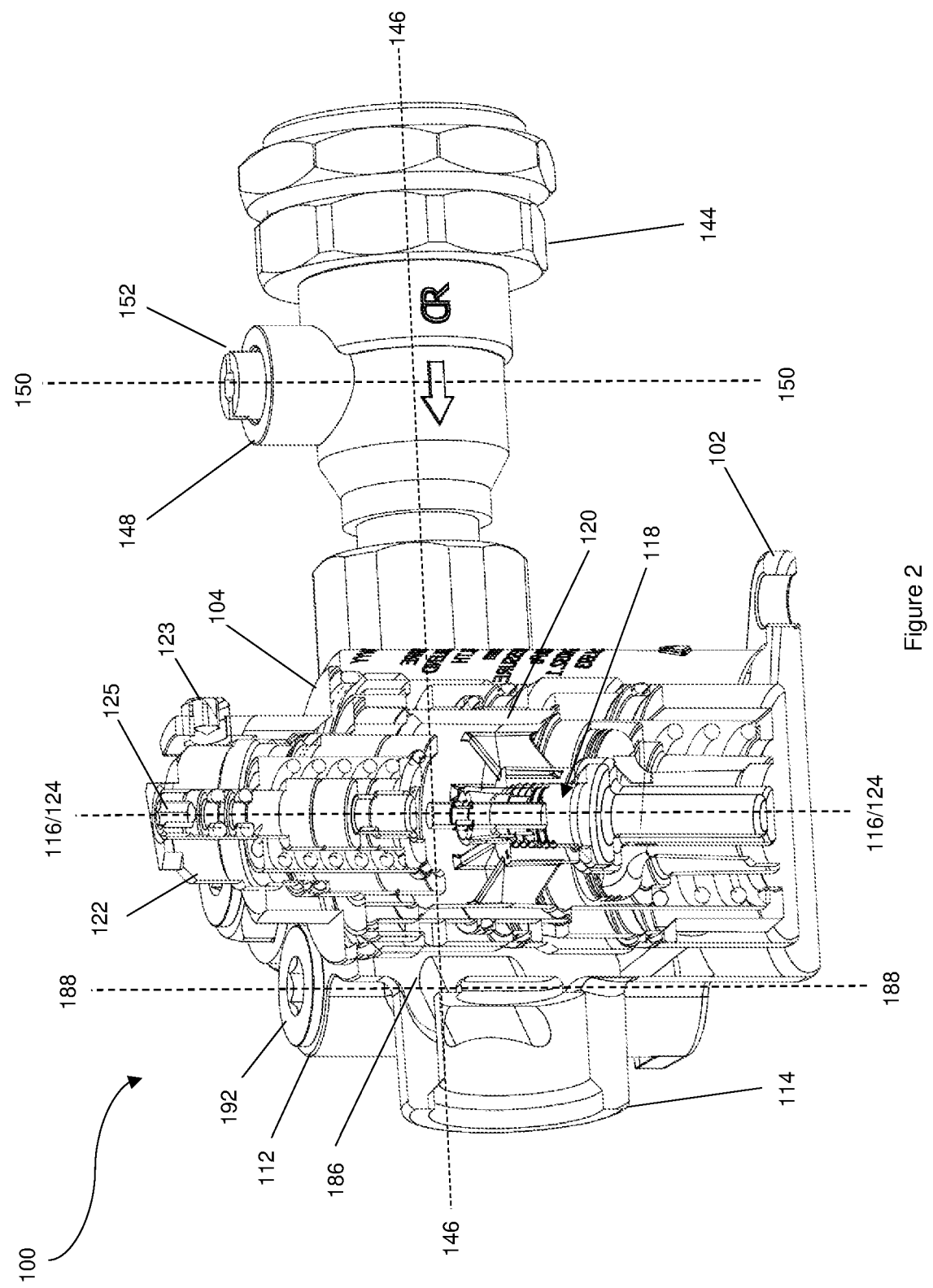
FIG. 2 is a section view of a thermostatic mixing valve of the fluid mixing assembly of FIG. 1.

Referring to FIG. 2, the thermostatic mixing valve 104 in this embodiment, as indicated above, uses the body 102 as its valve housing (i.e. it does not have a separate housing). The thermostatic mixing valve 104 has a longitudinal axis 116 and a mixing adjuster 118. The mixing adjuster 118 has a piston 120 configured to move back and forth along the longitudinal axis 116, with the assistance of a thermostatic element, to control the flow of hot and cold water through the thermostatic mixing valve 104 in order to regulate the temperature of the mixed water discharged from the thermostatic mixing valve 104. The discharge outlet 114 faces in a direction that is transverse to the longitudinal axis 116 and is configured to discharge the mixed water in a direction transverse to the longitudinal axis 116.

The mixing adjuster 118 allows a user to set the temperature of mixed water flowing out of the thermostatic mixing valve 104 by rotating an adjusting member 122 of the thermostatic mixing valve 104 about a mixing adjusting axis 124. As best seen in FIG. 2, the longitudinal axis 116 of the thermostatic mixing valve 104 and the mixing adjusting axis 124 are a common axis. Rotating the adjusting member 122 either clockwise or anti-clockwise about the mixing adjusting axis 124 will either increase or decrease the temperature of the mixed water flowing out of the thermostatic mixing valve 104. It will be appreciated that the operation as to how thermostatic mixing valves provide water at a constant temperature is well-known and will therefore not be described in detail.

The thermostatic mixing valve 104 has a grub screw 123 that is used to hold the adjusting member 122 in place after the adjusting member 122 has been adjusted to a desired setting. Tightening the grub screw prevents/restricts the adjusting member 122 from rotating about the mixing adjusting axis 124 and, therefore, prevents/restricts the adjusting member 122 from moving away from the desired setting. Loosening the grub screw 123 allows the adjusting member 122 to rotate about the mixing adjusting axis 124, which therefore allows the setting of the adjusting member 122 to be adjusted.

It will be appreciated that a plunger forming a thermal flush override feature 125 works in conjunction with the adjusting member 122 to set the temperature. The thermal flush override feature 125 is rotatable about the mixing adjusting axis 124. As best seen in FIG. 2, the adjusting member 122 and the thermal flush override feature 125 are coaxial. Rotating the thermal flush override feature 125 does not cause the adjusting member 122 to rotate when the grub screw 123 is tightened.

Further to the above, the thermal flush override feature 125 provides a stop that assists in setting a desired temperature with the adjusting member 122. In this regard, rotating the thermal flush override feature 125 may override the temperature of the mixed water set by the adjusting member 122 and flushes the thermostatic mixing valve 104 with hot water from a source of hot water that is coupled in fluid communication to the fluid mixing assembly 100 (discussed in more detail below). The thermal flush override feature 125 therefore allows the thermostatic mixing valve 104 to be flushed with mixed water having a temperature higher than that set by the adjusting member 122 and the override feature 125 in its initial position. Adjusting/rotating the thermal flush override feature 125 does not affect the setting of the adjusting member 122 and, therefore, the thermal flush override feature 125 allows the thermostatic mixing valve 104 to be flushed with hot water without changing the setting of the adjusting member 122.

The thermostatic mixing valve 104 has a cold-water inlet port 126 (see FIG. 3) that directs cold water into the thermostatic mixing valve 104, a hot-water inlet port 128 (see FIG. 4) that directs hot water into the thermostatic mixing valve 104, and an outlet port 130 (see FIG. 4) that directs the mixed hot and cold water out of the thermostatic mixing valve 104. The cold-water inlet port 126 is positioned to feed cold water into the thermostatic mixing valve 104 at the correct location and the hot-water inlet port 128 is positioned to feed hot water into the thermostatic mixing valve 104 at the correct location.

Figure 3:
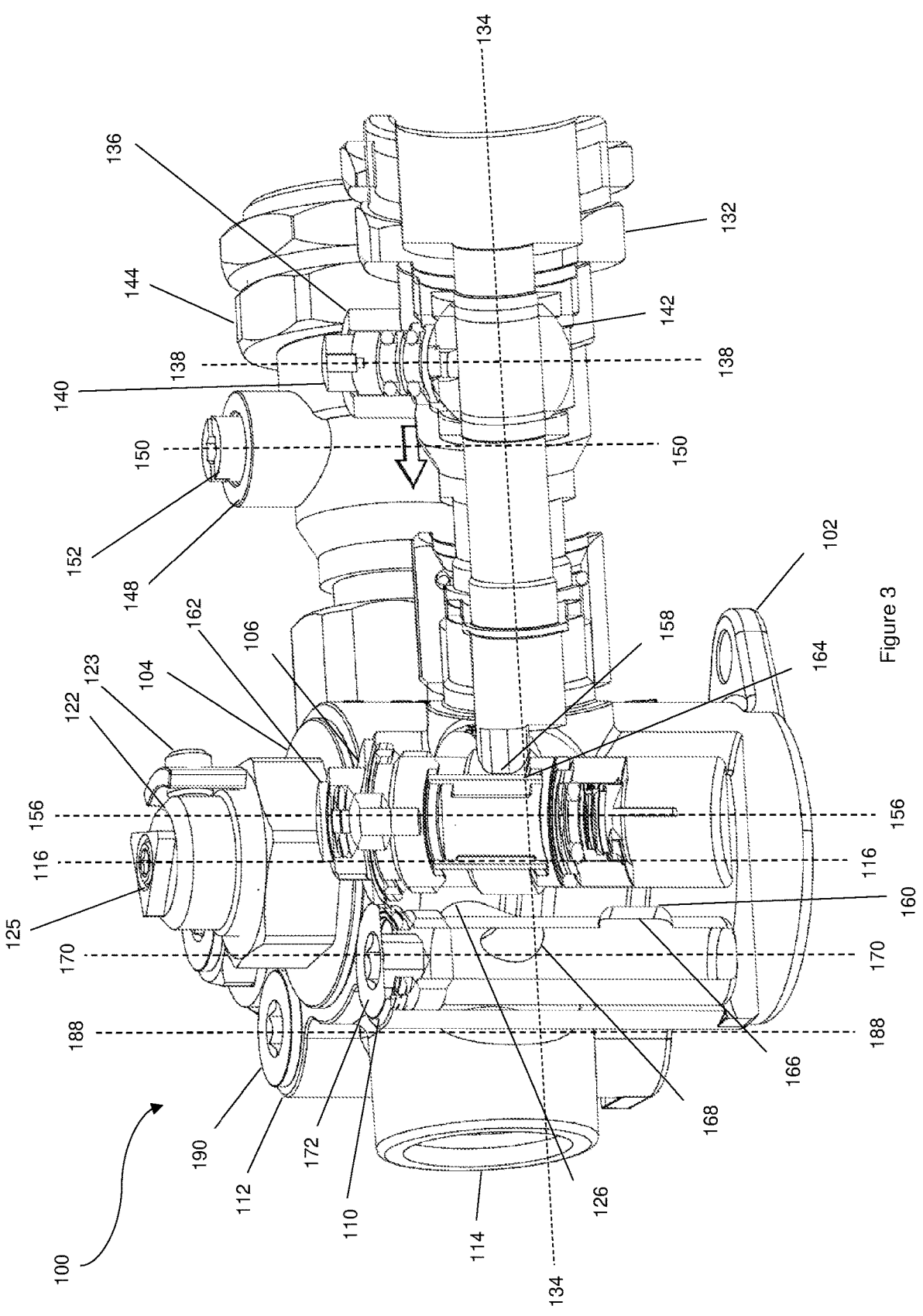
FIG. 3 is a section view of the fluid mixing assembly of FIG. 1 showing the cold-water flow path from the cold-water check valve into the thermostatic mixing valve.
Figure 5:
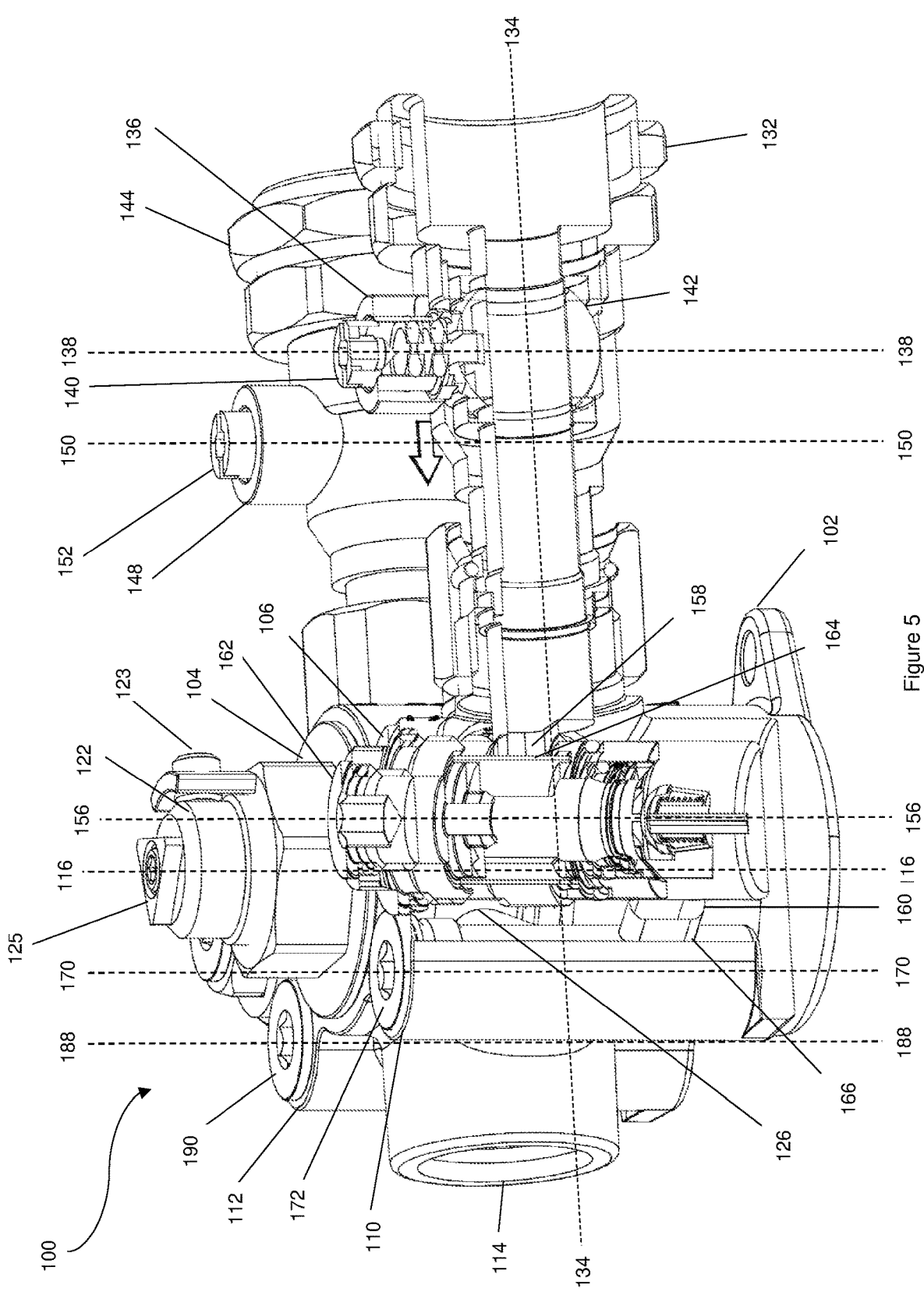
FIG. 5 is a section view of the fluid mixing assembly of FIG. 1 showing the cold-water flow path into the cold-water check valve.

Referring to FIGS. 3 and 5, a cold-water isolator 132 (e.g., a first isolator) is coupled to the body 102 and is in fluid communication with the cold-water check valve 106. The cold-water isolator 132 has a longitudinal axis 134 that is substantially perpendicular to the longitudinal axis 116 of the thermostatic mixing valve 104.

The cold-water isolator 132 has a fluid flow controller in the form of a ball valve 136 that is configured to control a flow of cold water flowing through the cold-water isolator 132. The ball valve 136 has an isolator adjusting axis 138 (e.g., a first isolator adjusting axis) that is substantially perpendicular to the longitudinal axis 134 of the cold-water isolator 132. It will be appreciated that regulating/controlling the flow of cold water flowing through the cold-water isolator 132 is achieved by rotating the adjusting member 140, and therefore the ball element 142, of the ball valve 136 about the isolator adjusting axis 138.

Figure 4:
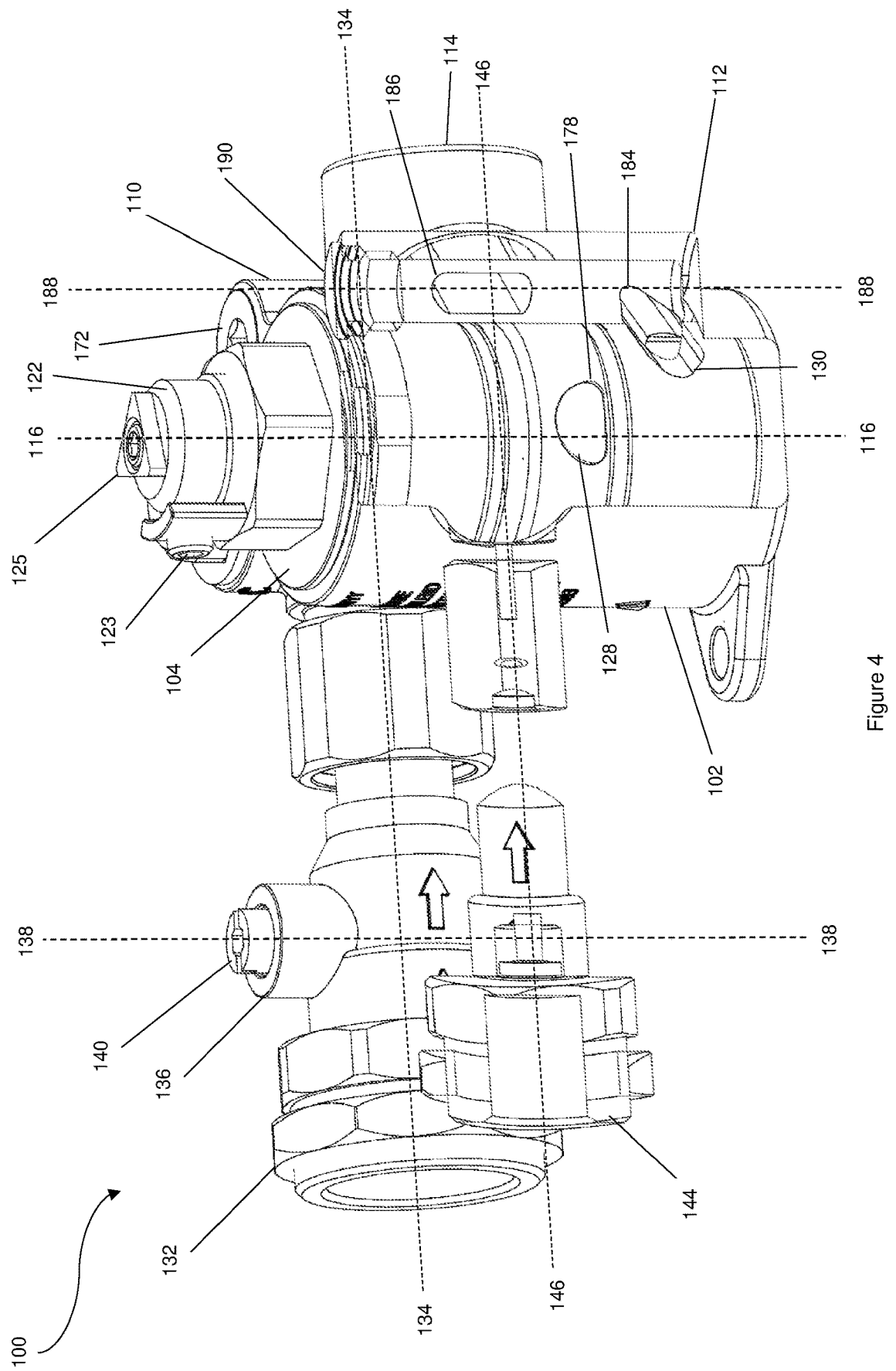
FIG. 4 is a section view of the fluid mixing assembly of FIG. 1 showing the hot-water flow path into the thermostatic mixing valve from the hot-water check valve and the mixed water flow path out of the thermostatic mixing valve and fluid mixing assembly.
Figure 6:
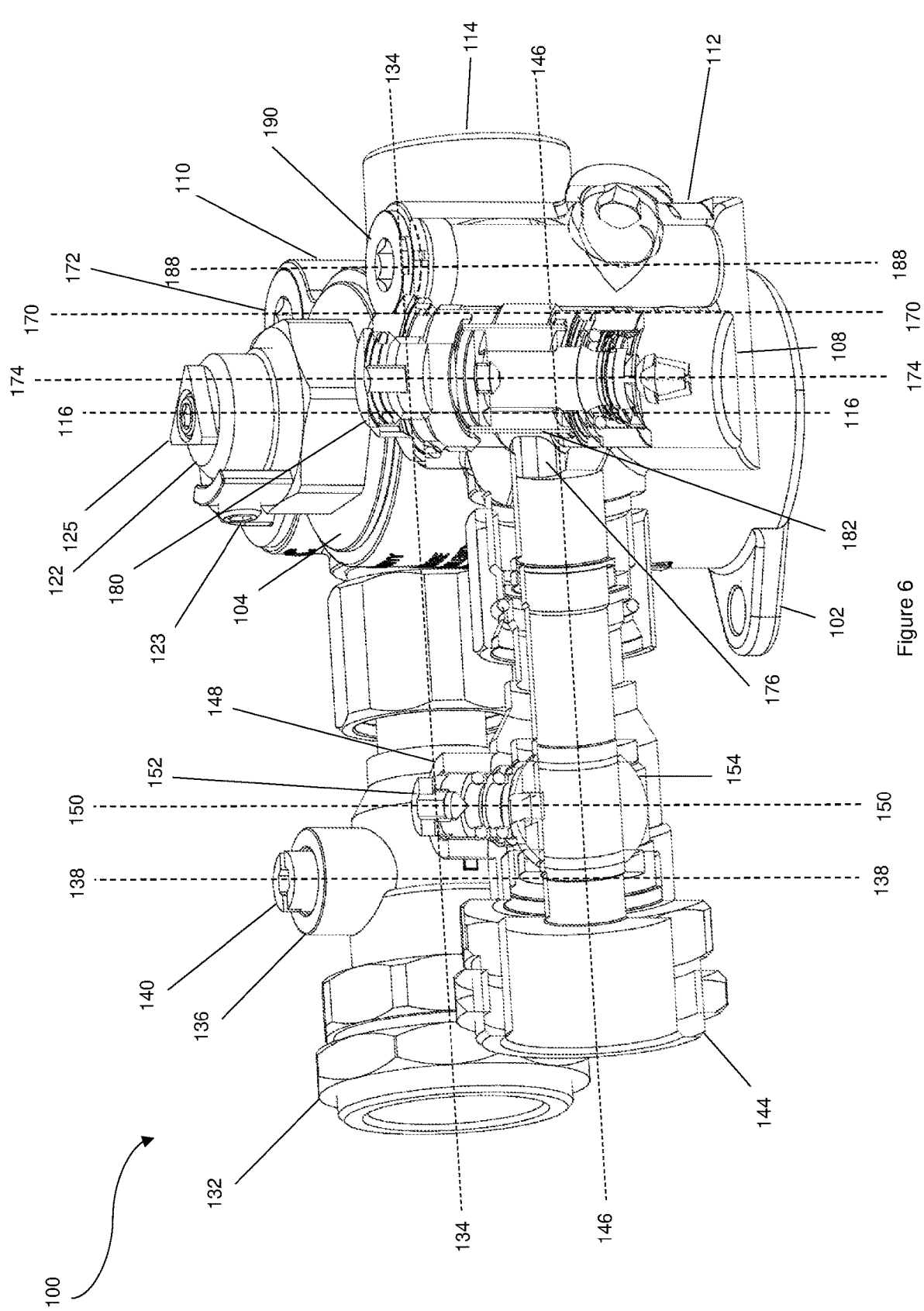
FIG. 6 is a section view of the fluid mixing assembly of FIG. 1 showing the hot-water flow path into the hot-water check valve.

Referring to FIGS. 4 and 6, a hot-water isolator 144 (e.g., a second isolator) is coupled to the body 102 and is in fluid communication with the hot-water check valve 108. The hot-water isolator 144 has a longitudinal axis 146 that is substantially perpendicular to the longitudinal axis 116 of the thermostatic mixing valve 104.

Referring to FIG. 6, the hot-water isolator 144 has a fluid flow controller in the form of a ball valve 148 that is configured to control a flow of hot water flowing through the hot-water isolator 144. The ball valve 148 has an isolator adjusting axis 150 (e.g., a second isolator adjusting axis) that is substantially perpendicular to the longitudinal axis 146 of the hot-water isolator 144. It will be appreciated that regulating/controlling the flow of hot water flowing through the hot-water isolator 144 is achieved by rotating the adjusting member 152, and therefore the ball element 154, of the ball valve 148 about the isolator adjusting axis 150.

As the longitudinal axis 134 of the cold-water isolator 132 and the longitudinal axis 146 of the hot-water isolator 144 are perpendicular to the longitudinal axis 116 of the thermostatic mixing valve 104, the longitudinal axis 116 and the isolator adjusting axes 138, 150 are substantially parallel. Accordingly, the adjusting member 122 of the thermostatic mixing valve 104, the thermal flush override feature 125 of the thermostatic mixing valve 104, the adjusting member 140 of the ball valve 136, and the adjusting member 152 of the ball valve 148 all face the same direction.

It will be appreciated that the longitudinal axis 134 of the cold-water isolator 132 and the longitudinal axis 146 of the hot-water isolator 144 do not need to be perpendicular to the longitudinal axis 116 of the thermostatic mixing valve 104. The cold-water isolator 132 and the hot-water isolator 144 may be coupled to the body 102 such that the longitudinal axes 134, 146 form an angle other than 90° with the longitudinal axis 116. In this case, the isolator adjusting axes 138, 150 may be disposed at an angle other than 90° to the respective longitudinal axes 134, 146 such that the longitudinal axis 116 and the isolator adjusting axes 138, 150 extend substantially in a common direction. Accordingly, the adjusting member 122 of the thermostatic mixing valve 104, the thermal flush override feature 125 of the thermostatic mixing valve 104, the adjusting member 140 of the ball valve 136, and the adjusting member 152 of the ball valve 148 substantially face in a common direction. This allows for tool access in the common direction.

Referring to FIG. 5, the cold-water check valve 106 is configured to permit cold water to flow from the cold-water isolator 132 into the cold-water check valve 106 but restrict/prevent cold water flowing from the cold-water check valve 106 into the cold-water isolator 132.

The cold-water check valve 106 has a longitudinal axis 156, an inlet port 158 in fluid communication with the cold-water isolator 132, and an outlet port 160. The cold-water check valve 106 is disposed in the body 102 such that the longitudinal axis 156 is parallel to the longitudinal axis 116 of the thermostatic mixing valve 104 and the isolator adjusting axis 138 does not intersect with the cold-water check valve 106.

The cold-water check valve 106 has a removable cap 162 threadably coupled to the body 102 and a filter 164 disposed in the cold-water check valve 106. The filter 164 is configured to filter cold water flowing into the cold-water check valve 106 from the cold-water isolator 132. When the removable cap 162 has been decoupled from the body 102, the inside of the cold-water check valve 106 is accessible for cleaning and the filter 164 can be removed from the cold-water check valve 106 for cleaning or replacement.

The removable cap 162 is removed from the body 102 by unscrewing the removable cap 162 from the body 102. To install the removable cap 162 to the body 102, the removable cap 162 is screwed into the body 102. The removable cap 162 is removed from/installed to the body 102 by rotating the removable cap 162 about the longitudinal axis 156 of the cold-water check valve 106. Referring to FIG. 5, the removable cap 162 faces the same direction as the adjusting member 122 of the thermostatic mixing valve 104.

The removable cap 162 may be replaced with a screw in temperature probe (not shown). The screw in temperature probe is removable from and couplable to the body 102 in a similar manner to that described above with respect to the removable cap 162.

Referring to FIGS. 3 and 5, the intermediate feed flow path 110 has an inlet port 166 in fluid communication with the outlet port 160 of the cold-water check valve 106, an outlet port 168 in fluid communication with the cold-water inlet port 126 of the thermostatic mixing valve 104, and a longitudinal axis 170. The intermediate feed flow path 110 is disposed in the body 102 such that the longitudinal axis 170 is parallel with the longitudinal axis 116 of the thermostatic mixing valve 104.

The intermediate feed flow path 110 also has a removable plug 172 that threadably engages the intermediate feed flow path 110. The removable plug 172 is removed from the intermediate feed flow path 110 by unscrewing the removable plug 172 from the intermediate feed flow path 110. When the removable plug 172 has been decoupled from the intermediate feed flow path 110, the inside of the intermediate feed flow path 110 is accessible and can be cleaned. To install the removable plug 172 in the intermediate feed flow path 110, the removable plug 172 is screwed into the intermediate feed flow path 110.

The removable plug 172 is removed from/installed into the intermediate feed flow path 110 by rotating the removable plug 172 about the longitudinal axis 170 of the intermediate feed flow path 110. Referring to FIGS. 3 and 5, the removable plug 172 faces the same direction as the adjusting member 122 of the thermostatic mixing valve 104.

The removable plug 172 may be replaced with a screw in temperature probe (not shown). The screw in temperature probe is removable from and couplable to the intermediate feed flow path 110 in a similar manner to that described above with respect to the removable plug 172.

Referring to FIGS. 4 and 6, the hot-water check valve 108 is configured to permit hot water to flow from the hot-water isolator 144 into the hot-water check valve 108 but restrict/prevent hot water flowing from the hot-water check valve 108 into the hot-isolator flow path 142.

The hot-water check valve 108 has a longitudinal axis 174, an inlet port 176 in fluid communication with the hot-water isolator 144, and an outlet port 178 in fluid communication with the hot-water inlet port 128 of the thermostatic mixing valve 104. The hot-water check valve 108 is disposed in the body 102 such that the longitudinal axis 174 is parallel to the longitudinal axis 116 of the thermostatic mixing valve 104 and the isolator adjusting axis 150 does not intersect the hot-water check valve 108.

The hot-water check valve 108 has a removable cap 180 threadably coupled to the body 102 and a filter 182 disposed in the hot-water check valve 108. The filter 182 is configured to filter hot water flowing into the hot-water check valve 108 from the hot-water isolator 144. When the removable cap 180 has been decoupled from the body 102, the inside of the hot-water check valve 108 is accessible for cleaning and the filter 182 can be removed from the hot-water check valve 108 for cleaning or replacement.

The removable cap 180 is removed from the body 102 by unscrewing the removable cap 180 from the body 102. To install the removable cap 180 to the body 102, the removable cap 180 is screwed into the body 102. The removable cap 180 is removed from/installed to the body 102 by rotating the removable cap 180 about the longitudinal axis 174 of the hot-water check valve 108. Referring to FIG. 6, the removable cap 180 faces the same direction as the adjusting member 122 of the thermostatic mixing valve 104.

The removable cap 180 may be replaced with a screw in temperature probe (not shown). The screw in temperature probe is removable from and couplable to the body 102 in a similar manner to that described above with respect to the removable cap 180.

Referring to FIGS. 2 and 4, the intermediate outlet flow path 112 has an inlet port 184 in fluid communication with the outlet port 130 of the thermostatic mixing valve 104, an outlet port 186 in fluid communication with the discharge outlet 114 of the body 102, and a longitudinal axis 188. The intermediate outlet flow path 112 is disposed in the body 102 such that the longitudinal axis 188 is parallel with the longitudinal axis 116 of the thermostatic mixing valve 104.

The intermediate outlet flow path 112 also has a removable plug 190 that threadably engages the intermediate outlet flow path 112. The removable plug 190 is removed from intermediate outlet flow path 112 by unscrewing the removable plug 190 from the intermediate outlet flow path 112. When the removable plug 190 has been decoupled from the intermediate outlet flow path 112, the inside of the intermediate outlet flow path 112 is accessible and can be cleaned. To install the removable plug 190 in the intermediate outlet flow path 112, the removable plug 190 is screwed into the intermediate outlet flow path 112.

The removable plug 190 is removed from/installed into the intermediate outlet flow path 112 by rotating the removable plug 190 about the longitudinal axis 188 of the intermediate outlet flow path 112. Referring to FIG. 6, the removable plug 190 faces the same direction as the adjusting member 122 of the thermostatic mixing valve 104.

The removable plug 190 may be replaced with a screw in temperature probe (not shown). The screw in temperature probe is removable from and couplable to the intermediate outlet flow path 112 in a similar manner to that described above with respect to the removable plug 190.

Operation and use of the fluid mixing assembly 100 will now be described. The thermostatic mixing valve 104 is configured to isolate the outlet port 130 from the cold-water check valve 106 and the hot-water check valve 108 when there is no supply of cold water or hot water to the thermostatic mixing valve 104.

A source of cold water is coupled in fluid communication to the cold-water isolator 132 and a source of hot water is coupled in fluid communication to the hot-water isolator 144. The adjusting member 122 of the mixing adjuster 118 is set by a user such that mixed water flowing out of the outlet port 130 of the thermostatic mixing valve 104 will be approximately at a desired temperature.

Once the user opens the ball valve 136 via the adjusting member 140 of the ball valve 136, cold water will flow through the cold-water isolator 132 from the source of cold water. Cold water flows through the cold-water isolator 132 and into the cold-water check valve 106 through the inlet port 158 and filter 164 of the cold-water check valve 106. The cold water then flows out of the cold-water check valve 106 through the outlet port 160 of the cold-water check valve 106 and into the intermediate feed flow path 110 through the inlet port 166 of the intermediate feed flow path 110. Subsequently, the cold water flows out of the intermediate feed flow path 110 through the outlet port 168 of the intermediate feed flow path 110 and into the thermostatic mixing valve 104 through the cold-water inlet port 126 of the thermostatic mixing valve 104.

Once the user opens the ball valve 148 via the adjusting member 152 of the ball valve 148, hot water will flow through the hot-water isolator 144 from the source of hot water. Hot water flows through the hot-water isolator 144 and into the hot-water check valve 108 through the inlet port 176 and filter 182 of the hot-water check valve 108. Subsequently, the hot water flows out of the hot-water check valve 108 through the outlet port 178 of the hot-water check valve 108 and into the thermostatic mixing valve 104 through the hot-water inlet port 128 of the thermostatic mixing valve 104.

The cold water and hot water mix together in the thermostatic mixing valve 104 to form mixed water having approximately the desired temperature set by the user via the adjusting member 122 of the mixing controller 118. In the event the desired temperature is not reached, a part of a thermostatic element moves in order to adjust its engagement with a stop, associated with the thermal flush override feature 125/adjusting member 118, in order to move the piston 120 to achieve the desired temperature. The mixed water flows out of the thermostatic mixing valve 104 through the outlet port 130 of the thermostatic mixing valve 104 and into the intermediate outlet flow path 112 through the inlet port 184 of the intermediate outlet flow path 112. Subsequently, the mixed water flows out of the intermediate outlet flow path 112 through the outlet port 186 of the intermediate outlet flow path 112 to the discharge outlet 114, where the mixed water is discharged from the fluid mixing assembly 100.

As each of the adjusting members 122, 140, 152, the thermal flush override feature 125, the removable caps 162, 180, and the removable plugs 172, 190 of the fluid mixing assembly 100 face the same direction, it will be appreciated that access to, and adjustment of, each of the adjusting members 122, 140, 152, the thermal flush override feature 125, the removable caps 162, 180, and the removable plugs 172, 190 is relatively easy, even when the fluid mixing assembly 100 is installed in a confined cabinet.

The hot-water bypass removable plug 192, shown in FIG. 1, allows a hot-water bypass device (not shown) to be coupled in fluid communication to the hot-water check valve 108. Such a hot-water bypass would permit the use of hot water elsewhere in the overall system in which the fluid mixing assembly 100 is installed. Similarly, a cold-water bypass removable plug (not shown) allows a cold-water bypass device (not shown) to be coupled in fluid communication to the cold-water check valve 106. The cold-water bypass removeable plug is arranged on the cold-water check valve 106 in a similar manner to the manner in which the hot-water bypass removeable plug 192 is arranged on the hot-water check valve 108 shown in FIG. 1. Such a cold-water bypass would permit the use of hot water elsewhere in the overall system in which the fluid mixing assembly 100 is installed.

It will also be appreciated that the cold-water bypass removable plug and the hot-water bypass removeable plug 192 reduce the complexity in manufacturing the body 102 of the fluid mixing assembly 100.

Although the fluid mixing assembly 100 has been described and illustrated as having a thermostatic mixing valve, it will be appreciated that the fluid mixing assembly 100 may be used with other suitable mixing valves or fluid mixing devices known in the art. It is envisaged that the check valves 106, 108 may be any other suitable one-way valves known in the art. It is also envisaged that the ball valves 136, 148 may be any other suitable fluid flow controllers known in the art that are capable of regulating/controlling the flow of water through the respective cold-water isolator 132 and hot-water isolator 144. It will also be appreciated that the fluid mixing assembly 100 is not limited to use with hot and cold water and may be used with other combinations of fluids, which are required to be supplied at a constant temperature.

It will also be appreciated that the source of hot water may be coupled in fluid communication to the cold-water isolator 132 and that the source of cold water may be coupled in fluid communication to the hot-water isolator 144 such that the hot water follows the cold water flow path described above and the cold water follows the hot water flow path described above. In this case, the cold-water inlet 124 and the hot-water inlet 126 of the thermostatic mixing valve 104 may have to be repositioned such that cold water and hot water is fed into the thermostatic mixing valve 104 at the correct location.

In this specification, adjectives such as left and right, top and bottom, hot and cold, first and second, and the like may be used to distinguish one element or action from another element or action without necessarily requiring or implying any actual such relationship or order. Where context permits, reference to a component, an integer or step (or the alike) is not to be construed as being limited to only one of that component, integer, or step, but rather could be one or more of that component, integer or step.

Although the invention has been described with reference to a preferred embodiment, it will be appreciated by persons skilled in the art that the invention may be embodied in many other forms. It will be appreciated by persons skilled in the art that numerous variations and/or modifications may be made to the technology as shown in the specific embodiments without departing from the spirit or scope of technology as broadly described. The present embodiments are, therefore, to be considered in all respects as illustrative and not restrictive.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

ITEM LIST

100—Fluid mixing assembly
102—Housing
104—Thermostatic mixing valve
106—Cold-water check valve
108—Hot-water check valve
110—Intermediate feed flow path
112—Intermediate outlet flow path
114—Discharge outlet
116—Longitudinal axis of thermostatic mixing valve 104
118—Mixing adjuster of thermostatic mixing valve 104
120—Piston of mixing adjuster 118
122—Adjusting member of mixing adjuster 118
123—Grub screw of thermostatic mixing valve 104
124—Mixing adjusting axis of mixing adjuster 118
125—Thermal flush temperature override feature of thermostatic mixing valve 104
126—Cold-water inlet port of thermostatic mixing valve 104
128—Hot-water inlet port of thermostatic mixing valve 104
130—Outlet port of thermostatic mixing valve 104
132—Cold-water isolator
134—Longitudinal axis of cold-water isolator 134
136—Ball valve of cold-water isolator 132
138—Isolator adjusting axis of ball valve 136
140—Adjusting member of ball valve 136
142—Ball element of ball valve 136
144—Hot-water isolator
146—Longitudinal axis of hot-water isolator 144
148—Ball valve of hot-water isolator 144

ITEM LIST

150—Isolator adjusting axis of ball valve 148
152—Adjusting member of ball valve 148
154—Ball element of ball valve 148
156—Longitudinal axis of cold-water check valve 106
158—Inlet port of cold-water check valve 106
160—Outlet port of cold-water check valve 106
162—Removable cap of cold-water check valve 106
164—Filter of cold-water check valve 106
166—Inlet port of intermediate feed flow path 110
168—Outlet port of intermediate feed flow path 110
170—Longitudinal axis of intermediate feed flow path 110
172—Removable plug of intermediate feed flow path 110
174—Longitudinal axis of hot-water check valve 108
176—Inlet port of hot-water check valve 108
178—Outlet port of hot-water check valve 108
180—Removable cap of hot-water check valve 108
182—Filter of hot-water check valve 108
184—Inlet port of intermediate outlet flow path 112
186—Outlet port of intermediate outlet flow path 112

188—Longitudinal axis of intermediate outlet flow path 112
190—Removable plug of intermediate outlet flow path 112
192—Hot-water bypass removable plug of hot-water check valve 108

The invention claimed is:

1. A fluid mixing assembly comprising:
a body having a discharge outlet for discharging fluid;
a fluid mixing device disposed in the body and in fluid communication with the discharge outlet, the fluid mixing device having an adjusting member adjustable about a mixing adjusting axis and configured to assist in controlling mixing of fluids in the fluid mixing device;
a first isolator in fluid communication with the fluid mixing device and configured to be coupled in fluid communication to a first source of fluid, the first isolator having an adjusting member adjustable about a first isolator adjusting axis and configured to control a flow of fluid through the first isolator; and
a second isolator in fluid communication with the fluid mixing device and configured to be coupled in fluid communication to a second source of fluid, the second isolator having an adjusting member adjustable about a second isolator adjusting axis and configured to control a flow of fluid through the second isolator;
wherein the first isolator and the second isolator are disposed relative to the fluid mixing device such that the mixing adjusting axis, the first isolator adjusting axis, and the second isolator adjusting axis extend substantially in a common direction;
wherein a first check valve and a second check valve are received at different positions along the body relative to the first isolator and the second isolator such that the first isolator adjusting axis and the second isolator adjusting axis do not respectively intersect the first check valve and the second check valve, the first check valve and the second check valve preventing backflow of fluid.

2. The fluid mixing assembly of claim 1, wherein the adjusting member is coupled to a piston movable in the common direction within the fluid mixing device.

3. The fluid mixing assembly of claim 1, wherein the discharge outlet is configured to discharge fluid in a discharge direction substantially perpendicular to the common direction.

4. The fluid mixing assembly of claim 1, wherein the mixing adjusting axis, the first isolator adjusting axis, and the second isolator adjusting axis are substantially parallel.

5. The fluid mixing assembly of claim 1, wherein the first check valve is in fluid communication with the fluid mixing device and the first isolator, the first isolator being in fluid communication with the fluid mixing device via the first check valve; and
the second check valve is in fluid communication with the fluid mixing device and the second isolator, the second isolator being in fluid communication with the fluid mixing device via the second check valve.

6. The fluid mixing assembly of claim 5, wherein:
the first check valve has a first check valve axis and a filter associated therewith; and
the second check valve has a second check valve axis and a filter associated therewith.

7. The fluid mixing assembly of claim 6, wherein:
the first check valve has a removable cap associated therewith that is configured to be coupled to and decoupled from the body by rotation about the first check valve axis, and decoupling the removable cap associated with the first check valve from the body permits access to the filter associated with the first check valve; and the second check valve has a removable cap associated therewith that is configured to be coupled to and decoupled from the body by rotation about the second check valve axis, and decoupling the removable cap associated with the second check valve from the body permits access to the filter associated with the second check valve.

8. The fluid mixing assembly of claim 6, wherein the first check valve and the second check valve are disposed at an angle relative to a discharge axis of the discharge outlet such that the first check valve axis and the second check valve axis extend substantially in the common direction.

9. The fluid mixing assembly of claim 5, further comprising an intermediate feed chamber in fluid communication with the first feed valve and the fluid mixing device, wherein the first isolator is in fluid communication with the fluid mixing device via the first feed valve and the intermediate feed chamber.

10. The fluid mixing assembly of claim 9, wherein the intermediate feed chamber and the intermediate outlet chamber are disposed in the body.

11. The fluid mixing assembly of claim 5, further comprising an intermediate outlet chamber in fluid communication with the fluid mixing device and the discharge outlet, wherein the fluid mixing device is in fluid communication with the discharge outlet via the intermediate outlet chamber.

12. The fluid mixing assembly of claim 1, wherein the mixing adjusting axis, the first isolator adjusting axis, the second isolator adjusting axis, a first check valve axis, and a second check valve axis are substantially parallel.

13. The fluid mixing assembly of claim 1, wherein the first check valve and the second check valve are received in a shoulder portion of the body.

14. The fluid mixing assembly of claim 1, wherein:

the adjusting member of the fluid mixing device is rotatable about the mixing adjusting axis;

the adjusting member of the first isolator is rotatable about the first isolator adjusting axis; and/or the adjusting member of the second isolator is rotatable about the second isolator adjusting axis.

15. The fluid mixing assembly of claim 1, wherein the first isolator and the second isolator are coupled to the body, and wherein the first isolator and the second isolator are substantially perpendicular to the fluid mixing device.

16. The fluid mixing assembly of claim 1, wherein the adjusting member of the first isolator adjusts a ball valve of the first isolator and the adjusting member of the second isolator adjusts a ball valve of the second isolator.

17. The fluid mixing assembly of claim 1, wherein the fluid mixing device has a thermal flush override feature configured to override the adjusting member of the fluid mixing device, the thermal flush override feature being rotatable about the mixing adjusting axis.

18. The fluid mixing assembly of claim 1, wherein a longitudinal axis of the first and second isolators is substantially parallel to a fluid discharge direction of the discharge outlet.

19. The mixing assembly of claim 1, wherein the fluid mixing device is a thermostatic mixing valve.

* * * * *